US009235423B2

(12) United States Patent
Maeno

(10) Patent No.: US 9,235,423 B2
(45) Date of Patent: Jan. 12, 2016

(54) AVAILABILITY EVALUATION DEVICE AND AVAILABILITY EVALUATION METHOD

(75) Inventor: Yoshiharu Maeno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 381 days.

(21) Appl. No.: 13/822,421

(22) PCT Filed: Sep. 12, 2011

(86) PCT No.: PCT/JP2011/070755
§ 371 (c)(1),
(2), (4) Date: Mar. 12, 2013

(87) PCT Pub. No.: WO2012/070294
PCT Pub. Date: May 31, 2012

(65) Prior Publication Data
US 2013/0174163 A1 Jul. 4, 2013

(30) Foreign Application Priority Data
Nov. 26, 2010 (JP) ................................. 2010-263498

(51) Int. Cl.
G06F 9/455 (2006.01)
G06F 9/44 (2006.01)
G06F 11/00 (2006.01)

(52) U.S. Cl.
CPC ................ *G06F 9/44* (2013.01); *G06F 11/008* (2013.01)

(58) Field of Classification Search
None
See application file for complete search history.

(56) References Cited

U.S. PATENT DOCUMENTS

| 7,103,874 B2 | 9/2006 | McCollum et al. |
| 7,756,803 B2 | 7/2010 | Narayan et al. |
| 2005/0091227 A1 | 4/2005 | McCollum et al. |
| 2008/0168314 A1 | 7/2008 | Narayan et al. |
| 2010/0153377 A1* | 6/2010 | Rajan et al. ................... 707/723 |

(Continued)

FOREIGN PATENT DOCUMENTS

| JP | 02-244223 | 9/1990 |
| JP | 2005-080104 | 3/2005 |

(Continued)

OTHER PUBLICATIONS

International Search Report PCT/JP2011/070755 dated Oct. 11, 2011, with English translation.

(Continued)

*Primary Examiner* — Dong Kim
(74) *Attorney, Agent, or Firm* — Young & Thompson

(57) ABSTRACT

Workload is mitigated when customizing adding a state transition resulting from a datacenter operation procedure, to an availability evaluation model of a server infrastructure, provided as a standard library. This involves: storing in a state transition storage unit (STSU) definitions of a plurality of state transitions corresponding to system configurations; storing in an additional STSU definitions of state transitions used in system operation, which are different from the plurality of state transitions; receiving definitions of state transitions and registering the definitions in the additional STSU; analyzing system availability based on the definitions of the state transitions stored in the STSU and the definitions of the state transitions stored in the additional STSU; analyzing common state transition patterns in at least part of definitions of the plurality of state transitions used when operating the system, and stored in the additional STSU; and outputting analysis results on the common state transition patterns.

10 Claims, 15 Drawing Sheets

(56) References Cited

U.S. PATENT DOCUMENTS

2012/0102369 A1* 4/2012 Hiltunen et al. ............... 714/48
2013/0198370 A1* 8/2013 Aguchi et al. ............... 709/224

FOREIGN PATENT DOCUMENTS

| | | |
|---|---|---|
| JP | 2006-127464 | 5/2006 |
| JP | 2007-509404 | 4/2007 |
| JP | 2007-226394 | 9/2007 |
| JP | 2008-532170 | 8/2008 |
| JP | 2009-080648 | 4/2009 |

OTHER PUBLICATIONS

H.H. Ammar, Y.F. Huang, and Ruey-Wen Liu, Hierarchical Models for Systems Reliability, Maintainability, and Availability, IEEE Transactions on Circuits and Systems, 1987.06, vol. CAS-34, No. 6, pp. 635-637.

Mikio Aoyama, "Kaisetsu Net Shiko Paradigm o Motomete: Application of Net Theory to Developing Distributed Systems", Joho Shori, Jun. 15, 1993, vol. 34, No. 6, p. 741.

Akira Tsuchiya, Motomitsu Adachi, Tokushu Outsourcing: Utility Computing and Operation Reforming, Fujitsu, Sep. 9, 2005, vol. 56, No. 5, pp. 444 to 446.

* cited by examiner

| OPERATION NAME | OPERATION PROCEDURE | EVENT NAME |
|---|---|---|
| OPERATION 001 | 1 RESTART USER VM | RESTART OF VM |
| OPERATION 002 | 1 DESCRIBE VIRTUAL INTERFACE INFORMATION IN SETTING FILE<br>2 DESCRIBE BRIDGE INFORMATION IN SETTING FILE<br>3 START GUEST OS | START OF GUEST OS |
| OPERATION 003 | 1 START GUEST OS<br>2 CHANGE HOST NAME<br>3 CHANGE IP ADDRESS | NETWORK SETTING |

FIG. 3

| EVENT NAME | TRANSITION SOURCE STATE NAME | TRANSITION DESTINATION STATE NAME | TRANSITION PROBABILITY |
|---|---|---|---|
| RESTART OF VM | IN OPERATION | USER VM STOPPED | 0.001 |
| START OF GUEST OS | GUEST OS STOPPED | IN OPERATION | 0.02 |
| NETWORK SETTING | GUEST OS STOPPED | IN OPERATION | 0.01 |

FIG. 7

| EVENT NAME | TRANSITION SOURCE STATE NAME | TRANSITION DESTINATION STATE NAME FOR SUCCESS CASE | TRANSITION DESTINATION STATE NAME FOR FAILURE CASE | SUCCESS PROBABILITY |
|---|---|---|---|---|
| RESTART OF VM | IN OPERATION | IN OPERATION | USER VM STOPPED | 0.999 |
| START OF GUEST OS | GUEST OS STOPPED | IN OPERATION | NW STOPPED | 0.995 |
| NETWORK SETTING | GUEST OS STOPPED | IN OPERATION | NW STOPPED | 0.996 |

FIG. 12

| EVENT NAME | TRANSITION SOURCE STATE NAME | TRANSITION DESTINATION STATE NAME | TRANSITION PROBABILITY |
|---|---|---|---|
| OCCURRENCE OF FAILURE | IN OPERATION | USER VM STOPPED | 0.015 |
| REPAIR OF FAILURE | USER VM STOPPED | IN OPERATION | 0.01 |

FIG. 14

| STATE NAME | NUMBER OF TOKENS |
|---|---|
| IN OPERATION | 8 |
| USER VM STOPPED | 2 |

FIG. 15

AVAILABILITY EVALUATION DEVICE AND AVAILABILITY EVALUATION METHOD

BACKGROUND

The present invention relates to an availability evaluation device and an availability evaluation method.

In recent years, a datacenter service that provides online server infrastructures (virtual machines or physical servers) to a number of tenant companies has become widespread. In providing such a service, it is important to evaluate the availability of systems so that the service level requested from each tenant is fulfilled. In evaluation of the system availability, a datacenter administrator customizes an availability evaluation model provided in advance for providing server infrastructures by taking a datacenter operation procedure such as setting changes or rebooting according to service level requirements or use characteristics of tenants into consideration. Moreover, the availability is calculated and verified based on the customized availability evaluation model.

Examples of techniques relating to a system that manages an availability evaluation model used when evaluating the availability are disclosed in Patent Documents 1 to 4. For example, Patent Document 1 discloses a method of predicting an operating ratio of an entire system based on information on system characteristics such as a failure rate in an individual computer of the system or a failure repair time and monitoring information on failures in operation. Moreover, Patent Document 2 discloses a method of forming a fault tree for making fault determination based on system configuration information related to software and hardware and analyzing whether a fault rate calculated based on the fault tree meets a reference value. Further, Patent Document 3 discloses a method of registering information on functions, configurations, securities, performances, and the like including availability as metadata at the time of installing an application program or an application service and using the metadata in the analysis of configuration management, failure detection, diagnosis, repair, and the like. Furthermore, Patent Document 4 discloses a method of storing a fault duration period and the number of users who were not able to use services due to faults whenever faults occur, storing these items of data, and estimating a fault duration ratio, a fault suffering ratio per user, an operating rate, and the like.

In particular, as for hardware, a method of analyzing the probability of faults in an entire system from the characteristics of components of a system using a mathematical model such as a fault tree is widely known. On the other hand, as for software, a method of describing state transitions using a mathematical model such as stochastic petri network and reproducing the transitions through simulations to analyze availability is generally known. The availability is an index that indicates the ratio in which users can use a service in a certain period and is used as a synonym of an operating ratio. For example, if there is a period in which on average a user cannot use a service for one minute a day, the availability is $1-1/(24\times60)=99.93\%$. In general, the availability is determined from a failure occurrence interval (mean time between failure) and a failure repair period (mean time to repair).

An example of calculating or verifying the availability from an availability evaluation model using the technique of such a stochastic petri network will be described below. FIG. 13 shows a stochastic petri network that defines state transitions of a virtual machine (also referred to as VM).

In a stochastic petri network, each state is represented by a rectangle with rounded corners. Here, a state "in operation" that indicates a state where a machine operates normally and a state "user VM stopped" that indicates a state where a user cannot use a service due to a failure are defined. A user VM is a general virtual machine that is allocated to a user and the user can access rather than a hypervisor that indicates a control program of a virtual machine that only a datacenter administrator can access.

Moreover, each transition is represented by a rectangle that indicates an event that causes a transition and an arrow that indicates the direction of the transition. Here, it is defined that a transition from "in operation" to "user VM stopped" occurs due to an even "occurrence of failure" and a transistor from "user VM stopped" to "in operation" occurs due to an even "repair of failure."

Although such a representation that is easily recognized visually as shown in FIG. 13 is easy for humans to understand, it is convenient to manage state transitions in a form of a table shown in FIG. 14 when stochastic Petri net analysis is implemented by a computer. This table is called a state transition management table. In the state transition management table, an event name, a transition source state name, a transition destination state name, and a transition probability are described for each event. For example, if a failure occurs with a probability of 0.015, and a virtual machine is in the "in operation" state, the state transitions to the "user VM stopped" state.

Based on such a state transition management table, it is possible to reproduce transitions through simulations and to analyze availability. In this case, a state table shown in FIG. 15 is used. In the state table, a state name and the number of tokens are described. In simulations, in order to analyze how many virtual machines are in the defined states, the number of virtual machines in the respective states is substituted with a concept of the number of tokens. For example, if there are 10 virtual machines in total, and all virtual machines are in operation, ten tokens are located in the "in operation" state, and zero (0) token is located in the "user VM stopped" state. Moreover, when a state transition occurs in any one virtual machine, one token moves. That is, the total number of tokens is constant. For example, it is assumed that when a simulation was started to cause state transitions to occur according to a transition probability, two failures occurred. In this case, as shown in FIG. 15, a state where eight tokens are located in the "in operation" state, and two tokens are moved to the "user VM stopped" state is created.

Moreover, the value of availability can be calculated from the rate where at least one tokens are located in the "user VM stopped" state. The value of availability changes depending on the definition of failures and operations. For example, if it is regarded that a system operates normally when at least a half of virtual machines are operating, the state of FIG. 15 where two tokens are located in the "user VM stopped" state can be regarded as a state where the system operates normally.

Patent Document 1: Patent Publication JP-T-2008-532170
Patent Document 2: Patent Publication JP-A-2006-127464
Patent Document 3: Patent Publication JP-T-2007-509404
Patent Document 4: Patent Publication JP-A-2005-080104

However, an availability evaluation model represented by stochastic petri networks is one that is customized by a datacenter administrator based on an availability evaluation model for a server infrastructure, which is standardly provided in a library of a system, by taking the server infrastructure characteristics and the datacenter operation procedure associated with the server infrastructure into consideration. That is, it is necessary to create various availability evaluation models according to the operation procedure. Thus, when dealing with a new tenant company and defining a new operation procedure, the datacenter administrator needs to customize the availability evaluation models by taking the server infrastructure characteristics and the datacenter operation procedure associated with the server infrastructure into consideration.

Such a customization operation involves extracting all state transitions of the server infrastructures, which can occur resulting from a datacenter operation procedure, without exception and designing in detail how these state transitions will be incorporated into an availability evaluation model such as a stochastic petri network that describes individual server infrastructures such as virtual machines. Thus, the datacenter administrator has to repeatedly perform such a complicated customization operation whenever a tenant company or an operation procedure is added, and the workload increases.

SUMMARY

The invention has been made in view of the above problems, and an object of the present invention is to mitigate a workload when performing customization for adding a state transition resulting from a datacenter operation procedure to an availability evaluation model of server infrastructures, which is standardly provided as a library.

An availability evaluation device according to a first aspect of the present invention includes: a state transition storage unit that stores definitions of a plurality of state transitions corresponding to configurations of a system; an additional state transition storage unit that stores definitions of state transitions that are used when operating the system and that are different from the plurality of state transitions; an operation registration unit that receives the definitions of the state transitions used when operating the system and registers the definitions in the additional state transition storage unit; an availability analyzing unit that analyzes the availability of the system based on the definitions of the state transitions stored in the state transition storage unit and the definitions of the state transitions stored in the additional state transition storage unit; an operation analysis unit that analyzes common state transition patterns in at least part of definitions of the plurality of state transitions used when operating the system, and stored in the additional state transition storage unit; and an operation analysis result output unit that outputs analysis results obtained by the operation analysis unit.

In the present invention, a "unit" does not mean a physical means only but includes a case where the function of the "unit" is realized by software. Moreover, the function of one "unit" or device may be realized by two or more physical means or devices, and the functions of two or more "units" or devices may be realized by one physical means or device.

According to the present invention, it is possible to mitigate a workload when performing customization for adding a state transition resulting from a datacenter operation procedure to an availability evaluation model of server infrastructures, which is standardly provided as a library.

DESCRIPTION OF THE DRAWINGS

FIG. 3 is a view showing an example of an operation registration table.

FIG. 7 is a view showing an example of an additional state transition registration table corresponding to an additional operation.

FIG. 12 is a view showing an example of an additional state transition registration table.

FIG. 14 shows an example of a state transition management table.

FIG. 15 is a view showing an example of a state table.

DETAILED DESCRIPTION

Hereinafter, an embodiment of the present invention will be described with reference to the drawings.

Figure 1:
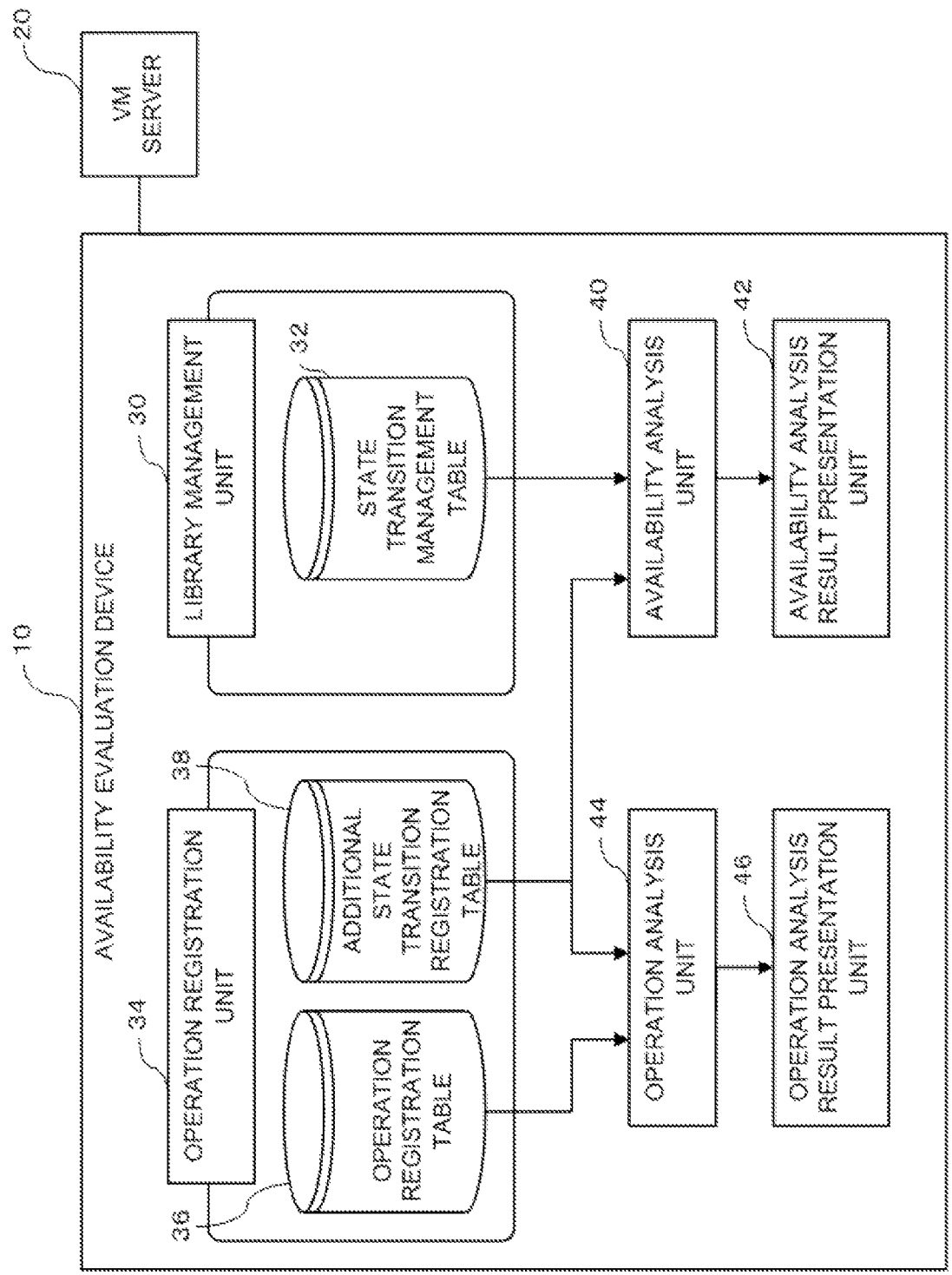
FIG. 1 is a view showing a configuration example of an availability according to an embodiment of the present invention.

FIG. 1 is a view showing a configuration example of an availability evaluation device according to an embodiment of the present invention. An availability evaluation device 10 is a device that evaluates availability of a virtual machine server 20 that provides a virtual machine to a user. The availability evaluation device 10 is an information processing device such as an application server and is configured to include a processor, a memory, an input device, a storage device, and the like.

Moreover, as shown in FIG. 1, the availability evaluation device 10 is configured to include a library management unit 30, a state transition management table (state transition storage unit) 32, an operation registration unit 34, an operation registration table 36, an additional state transition registration table (additional state transition storage unit) 38, an availability analyzing unit 40, an availability analysis result presentation unit 42, an operation analysis unit 4, and an operation analysis result presentation unit 46. The library management unit 30, the operation registration unit 34, the availability analyzing unit 40, the availability analysis result presentation unit 42, the operation analysis unit 4, and the operation analysis result presentation unit 46 can be realized when processor executes a program stored in a memory, for example. Moreover, the state transition management table 32, the operation registration table 36, and the additional state transition registration table can be realized using a storage area of a memory or a storage device.

The library management unit 30 manages the state transition management table 32 corresponding to an availability evaluation model (stochastic petri network) of a virtual machine. Management means being provided a mechanism for maintaining these management tables permanently and being able to register, update, and refer to the management tables.

Figure 2:
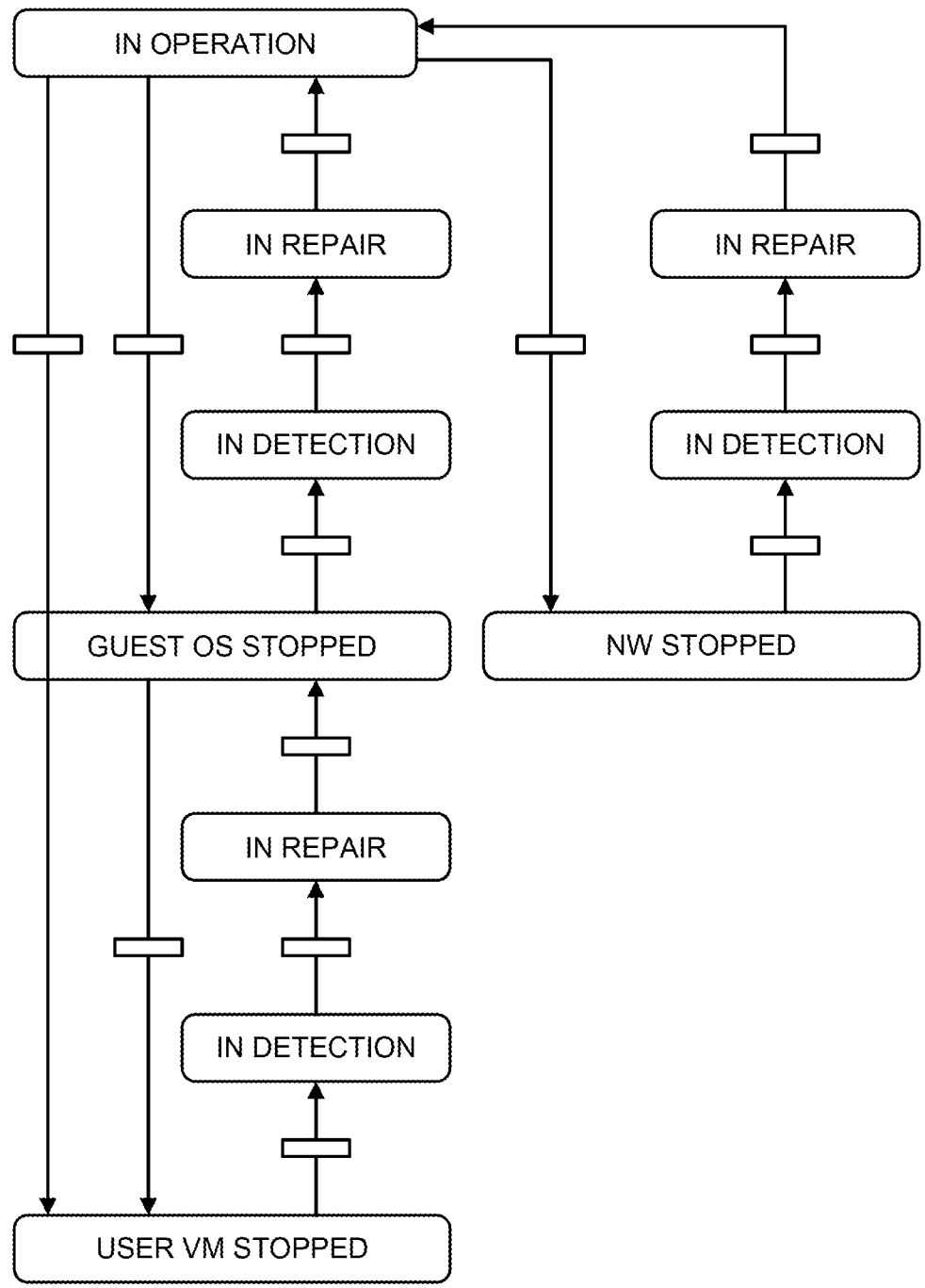
FIG. 2 shows an example of an availability evaluation model showing a plurality of state transitions corresponding to configurations of a system of a virtual machine server.

FIG. 2 shows an example of an availability evaluation model showing a plurality of state transitions corresponding to configurations of a system of the virtual machine server 20. The availability evaluation model is managed in the library management unit 30 as the state transition management table 32 as shown in FIG. 14, for example. In the state transition management table 32, an event name, a transition source state name, a transition destination state name, and a transition probability are included. The system configuration of the virtual machine 20 includes basic software such as a network device such as server hardware (physical server), a router, a switch, or a load balancer, and a user OS, in addition to virtual machines. The library management unit 30 can manage the state transition management table 32 representing the availability evaluation model corresponding to these system components as well as virtual machines.

Returning to FIG. 1, the operation registration unit 34 provides a function of managing customization of state transitions occurring due to an operation procedure of the virtual machine 20 and manages the operation registration table 36 and the additional state transition registration table 38.

FIG. 3 shows an example of the operation registration table 36. As shown in FIG. 3, the operation registration table 36 includes an operation name, an operation procedure, and an event name for each operation. The operation may be the granularity of an entire bunch of operations and may be the granularity of part of operations. As shown in FIG. 3, the operation registration table 36 may directly describe the specific content (workflow) of an operation procedure and may describe the name or the like of a document or a command script that describes the operation procedure so that the document or the command script can be referred to.

The state transition corresponding to such an operation procedure is unique to the operation procedure and is not described in the availability evaluation model corresponding to the system configuration of the virtual machine 20 that is included in the state transition management table 32 managed by the library management unit 30. Thus, in order to evaluate the availability with the operation procedure also taken into consideration in addition to the system configuration, it is necessary to customize the availability evaluation model according to an addition of operation procedure.

Figure 4:
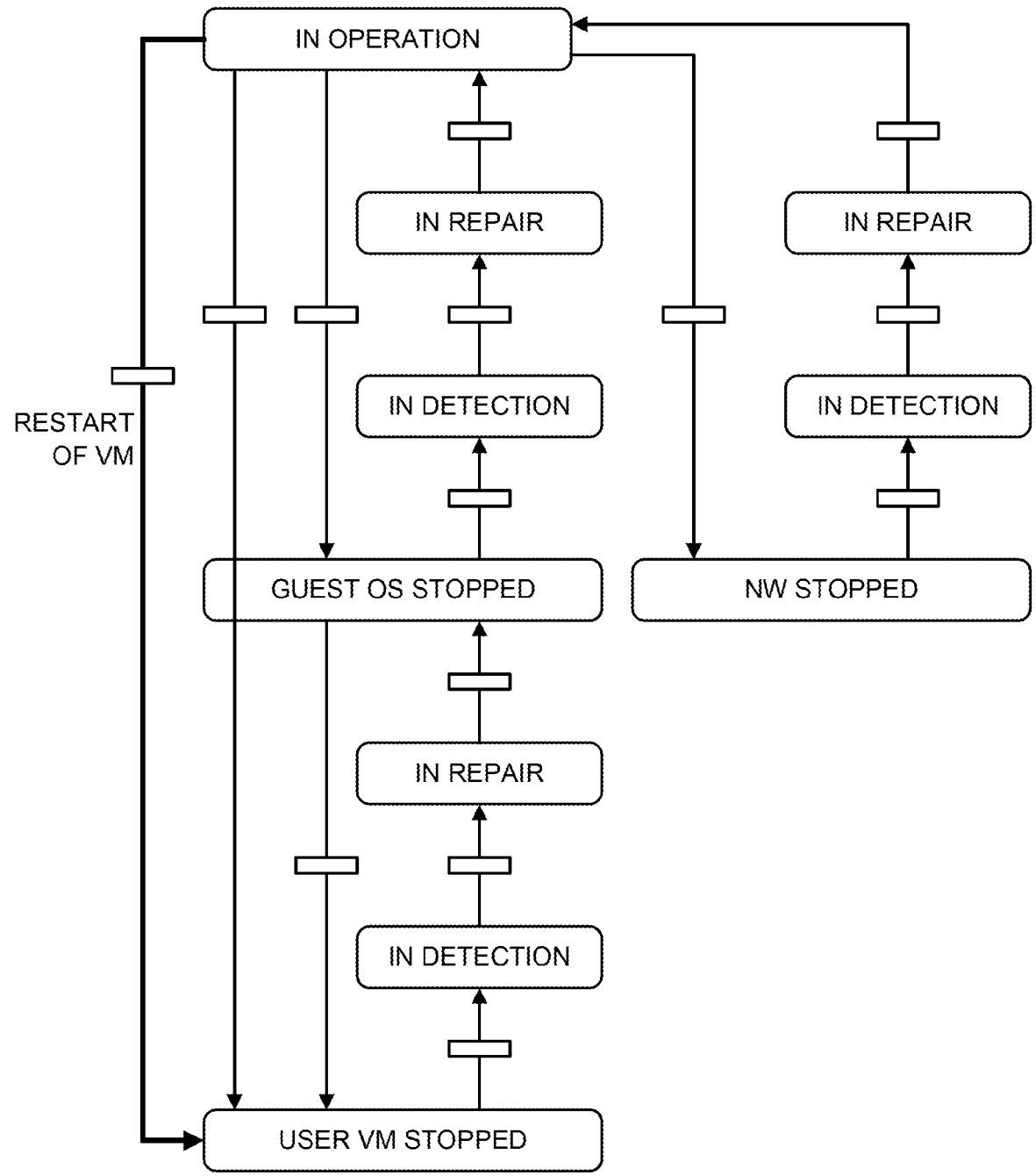
FIG. 4 is a view showing an example of a state transition added to an availability evaluation model.
Figure 5:
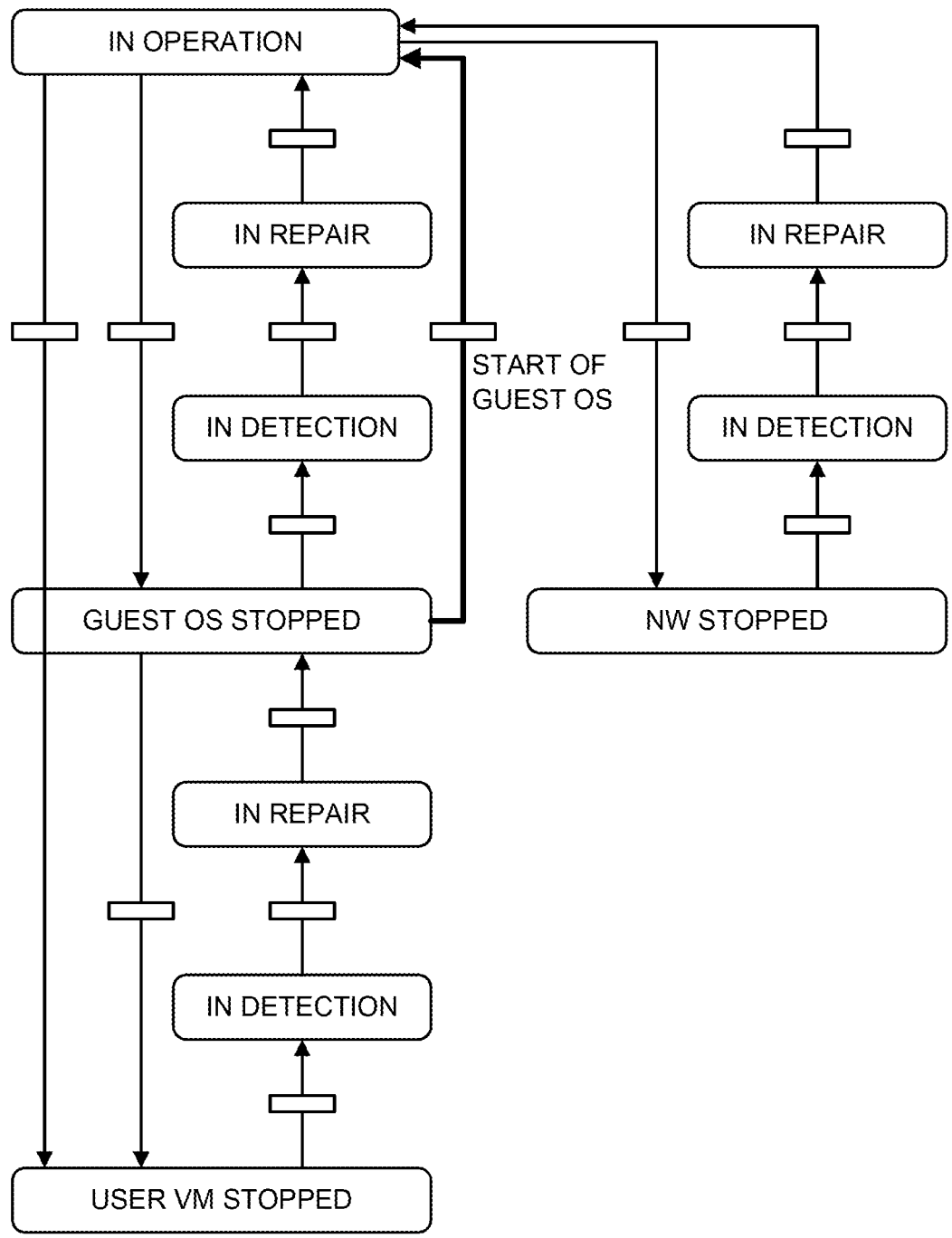
FIG. 5 is a view showing an example of a state transition added to an availability evaluation model.
Figure 6:
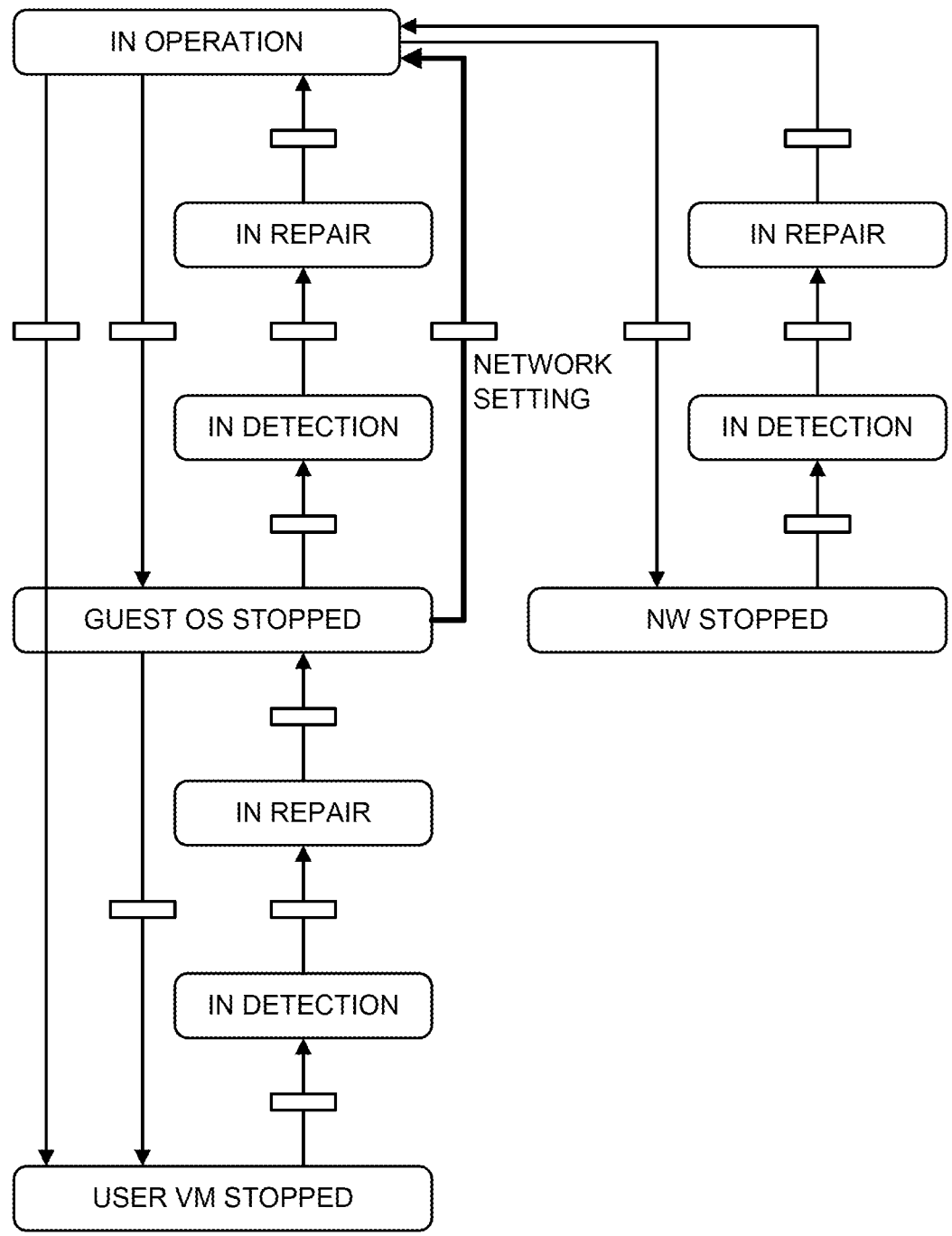
FIG. 6 is a view showing an example of a state transition added to an availability evaluation model.

FIGS. 4 to 6 show examples of state transitions added to the availability evaluation model shown in FIG. 2. For example, in FIG. 4, an operation in which an "in operation" state transitions to a "user VM stopped" state is added according to a "restart of VM" event. Moreover, in FIG. 5, an operation in which a "guest OS stopped" state transitions to the "in operation" state is added according to a "start of guest OS" event. Further, in FIG. 6, an operation in which the "guest OS stopped" state transitions to the "in operation" state is added according to a "network setting" event. FIG. 7 shows an example of the additional state transition registration table 38 corresponding to these additional operations. As shown in FIG. 7, the format of the additional state transition registration table 38 is similar to the format of the state transition management table 32 and includes the event name, the transition source state name, the transition destination state name, and the transition probability of the availability evaluation model for each event.

The names of operations, events, states, and the like in the state transition management table 32, the operation registration table 36, and the additional state transition registration table 38 may be optional character strings and symbols as long as they do not overlap and can be used as identifiers.

Returning to FIG. 1, the availability analyzing unit 40 performs simulations on the availability evaluation model using the state table shown in FIG. 15 based on the state transition management table 32 managed by the library management unit 30 and the additional state transition registration table 38 managed by the operation registration unit 34 to calculate the availability of the system.

The availability analysis result presentation unit 42 provides an interface for presenting the availability calculated by the availability analyzing unit 40 to the datacenter administrator. The analysis result may be presented, for example, by displaying on a screen, printing out using a printer, outputting a predetermined format of data, and the like.

The operation analysis unit 44 interprets the additional state transition registration table 38 managed by the operation registration unit 34 to analyze the characteristics of the definitions of state transitions corresponding to operations. For example, the operation analysis unit 44 extracts customization patterns (pairs of transition source states and transition destination states) that occur frequently among the definitions of the state transitions registered in the additional state transition registration table 38. In the case of the additional state transition registration table 38 shown in FIG. 7, the set of "in operation" and "user VM stopped" states occurs once, and the set of "guest OS stopped" and "in operation" states occurs twice. Since the number of occurrences of the latter is larger than the former, the operation analysis unit 44 selects the pattern (the set of "guest OS stopped" and "in operation" states) as the most frequent customization pattern. The operation analysis unit 44 can extract the most frequent customization pattern by aggregating the number of occurrences of all sets of states which can occur from the defined states.

The operation analysis result presentation unit 46 presents the analysis result of the operation analysis unit 44. For example, the operation analysis result presentation unit 46 provides an interface for presenting the customization patterns extracted by the operation analysis unit 44 to the datacenter administrator. The analysis result may be presented, for example, by displaying on a screen, printing out using a printer, outputting a predetermined format of data, and the like. For example, the operation analysis result presentation unit 46 can present the analysis result to the datacenter administrator by displaying the frequent customization patterns extracted by the operation analysis unit 44 on a screen. In addition to the set of "guest OS stopped" and "in operation" states, the operation analysis result presentation unit 46 may further display the "start of guest OS" and "network setting" which are the event names of the stochastic petri network corresponding to this set.

The analysis result presented to the datacenter administrator in this manner can be used as reference information for the datacenter administrator when adding new operations to the additional state transition registration table 38. For example, the extracted customization patterns may be displayed on a registration screen of the additional state transition registration table 38, and the extracted customization patterns may be configured to be selectable in the input fields of transition source and transition destination state names. Thus, it is possible to mitigate the load of the customization operation performed by the datacenter administrator whenever tenant companies are added and operation procedures are added.

Figure 8:
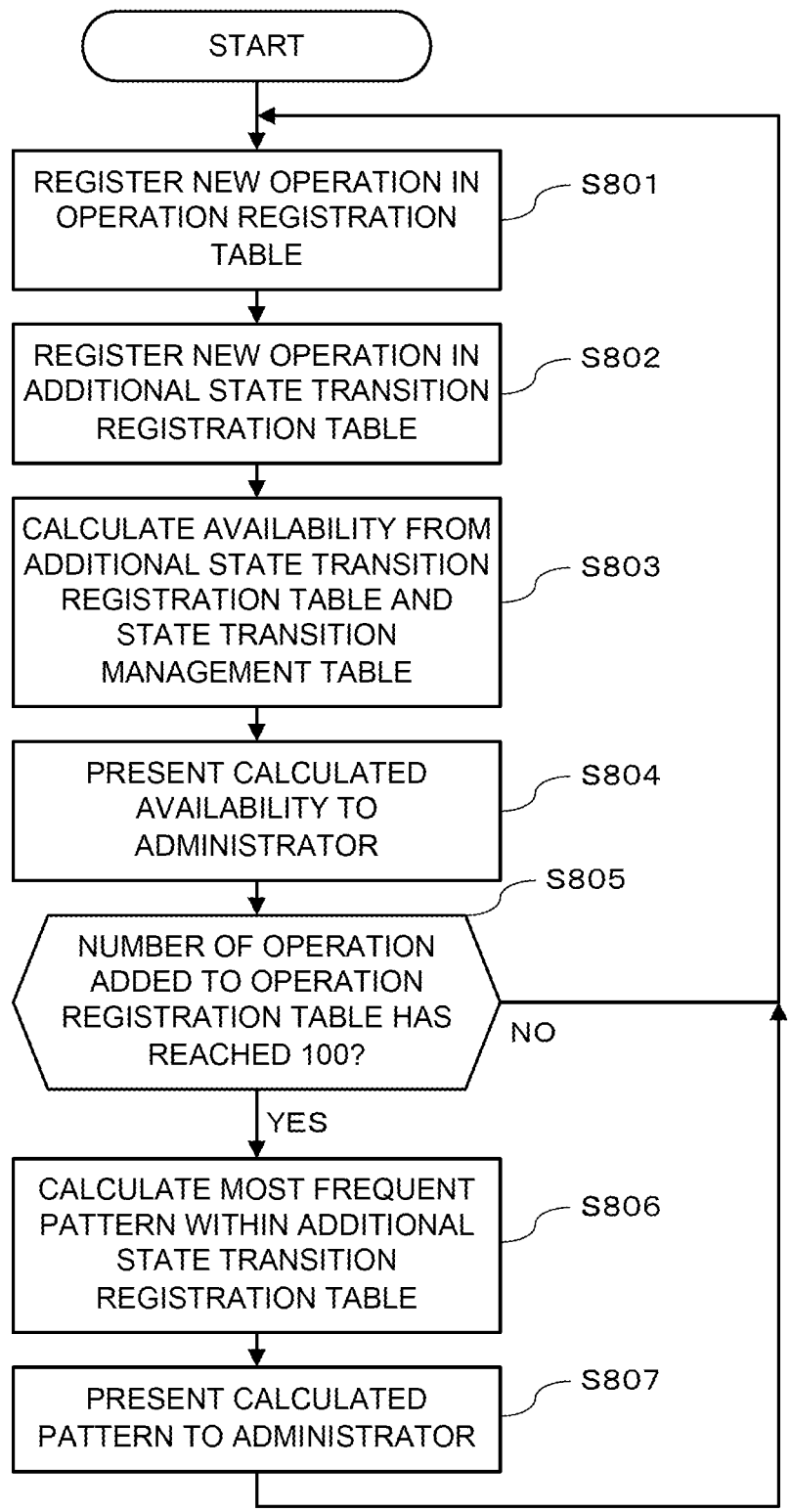
FIG. 8 is a flowchart showing an example of the operation of an availability evaluation device.

An example of the operation of the availability evaluation device 10 will be described with reference to the flowchart of FIG. 8. First, when dealing with a new tenant company and defining a new operation procedure, the operation registration unit 34 receives definitions of state transitions of the added operation from the datacenter administrator and registers the definitions in the operation registration table 36 (S801). As a result, an operation name, an operation procedure, and an event name of the corresponding stochastic petri network are registered in the operation registration table 36. Further, the operation registration unit 34 receives the event name of the stochastic petri network, the transition source state name, the transition destination state name, and the transition probability corresponding to the newly created operation from the datacenter administrator and registers the same in the additional state transition registration table 38 (S802).

Subsequently, the availability analyzing unit 40 calculates the system availability including the operation procedure of the virtual machine server 20 by referring to the state transition management table 32 managed by the library management unit 30 and the additional state transition registration table 38 newly registered by the operation registration unit 34 (S803). The availability analysis result presentation unit 42 presents the analysis result on the availability to the datacenter administrator by displaying the value of the availability calculated by the availability analyzing unit 40 on a screen, for example, (S804).

The operation analysis unit 44 determines by counting whether the number of operations in the operation registration table 36 registered by the operation registration unit 34 has reached 100 (S805). The operation analysis unit 44 may determine the number of newly registered operations by referring to the additional state transition registration table 38 rather than the operation registration table 36. If the number of newly registered operations is smaller than 100 (S805: NO), the flow returns to the start and the process (S801 and S802) of registering in the operation registration table 36 and the additional state transition registration table 38 and the availability evaluation process (S803 and S804) are repeated.

If the number of added operations has reached 100 (S805: YES), the operation analysis unit 44 finds the most frequently occurring state transition pattern within the additional state transition registration table 38 and selects the state transition pattern as the most frequent customization pattern (S806). Moreover, the operation analysis result presentation unit 46 presents the analysis result on the characteristics of state transitions occurring when operating the system to the datacenter administrator by displaying the selected frequent customization pattern on a screen, for example, (S807).

The number 100 is an example, and for example, another number may be set as a threshold value based on the operation policy of the datacenter. Moreover, rather than using the number of operations, the operation analysis unit 44 may perform the analysis every predetermined period (for example, every 30 days). Further, rather than simply using the most frequent state transition pattern, a most frequent state transition on pattern under such a condition that a transition source is a specific state, a most frequent state transition pattern under such a condition that a transition probability has a specific value or more, and the like may be selected as the frequent customization pattern.

The present embodiment has been described above. According to the availability evaluation device 10 of the present embodiment, the analysis result on the state transitions registered in the additional state transition registration table 38 is presented to the datacenter administrator. Thus, it is possible to mitigate the workload of customization for adding state transitions resulting from the operation procedure of the virtual machine 20 to the availability evaluation model of the virtual machine server 20 which is standardly provided as a library.

The present embodiment is for a better understanding of the present invention and is not for limiting interpretation of the present invention. Various changes and improvements can be made without departing from the spirit and scope of the present invention, and their equivalents are also included within the scope of the present invention.

Figure 9:
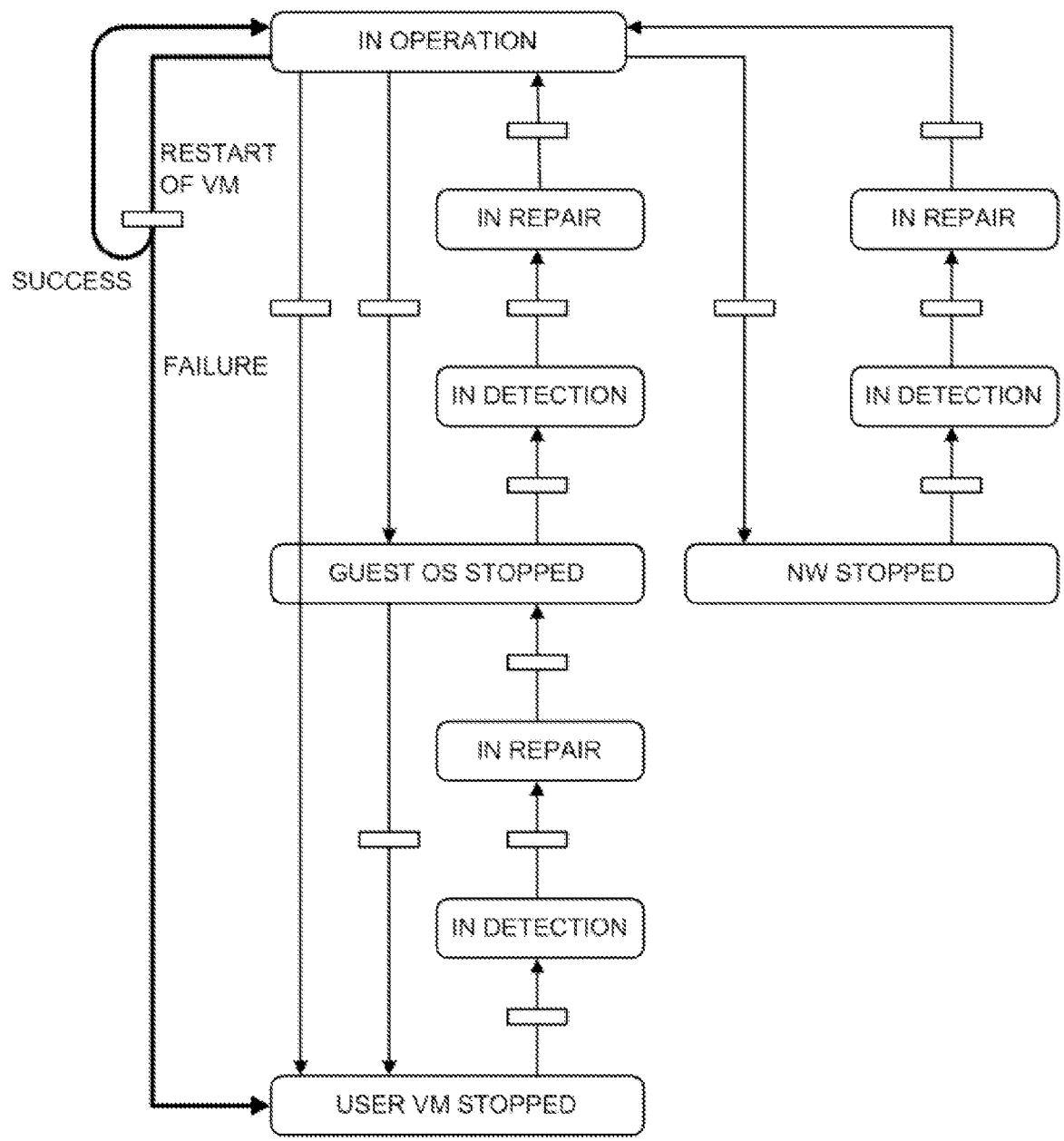
FIG. 9 is a view showing an example of an availability evaluation model in which cases where an operation procedure succeeds and fails are taken into consideration.
Figure 10:
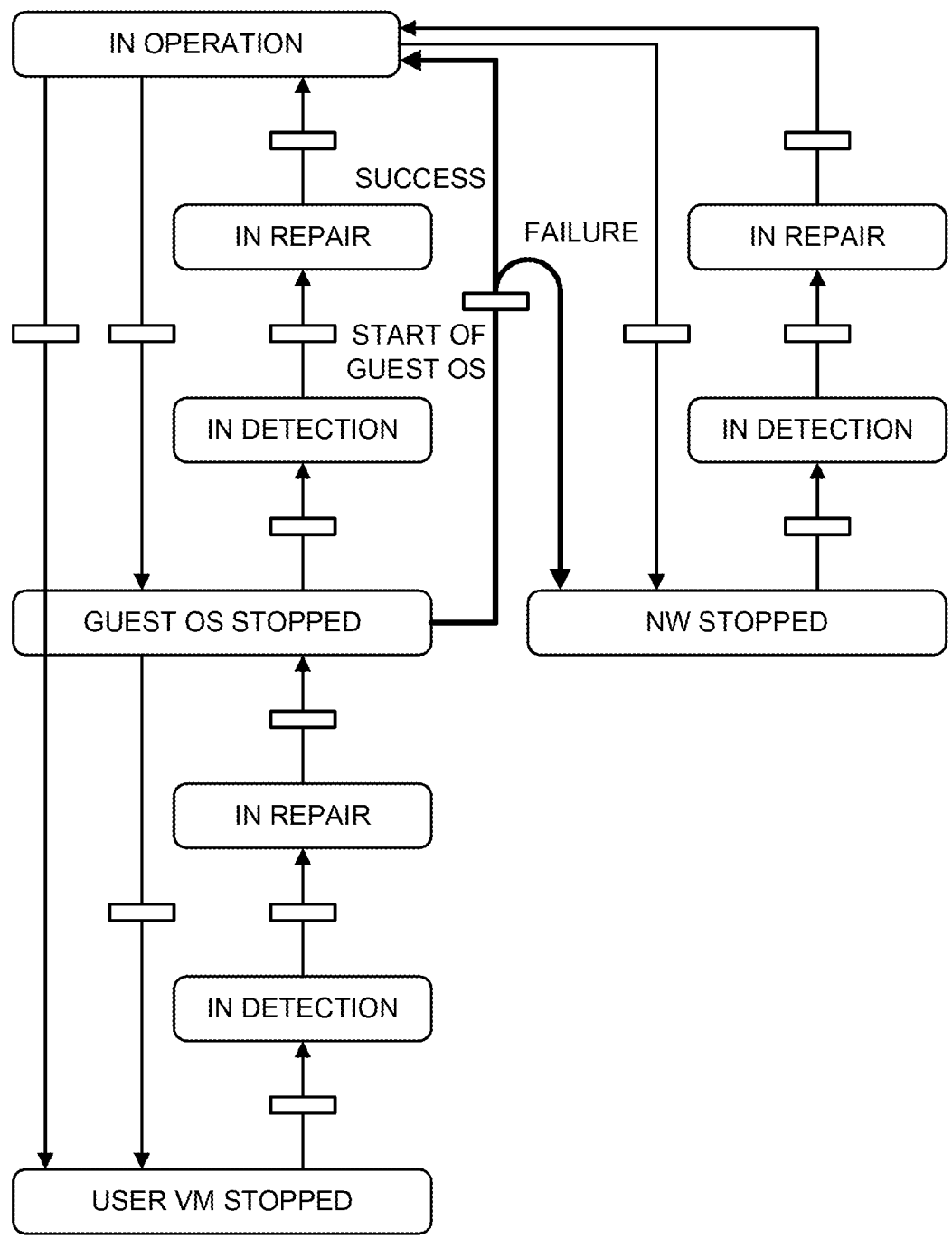
FIG. 10 is a view showing an example of an availability evaluation model in which cases where an operation procedure succeeds and fails are taken into consideration.
Figure 11:
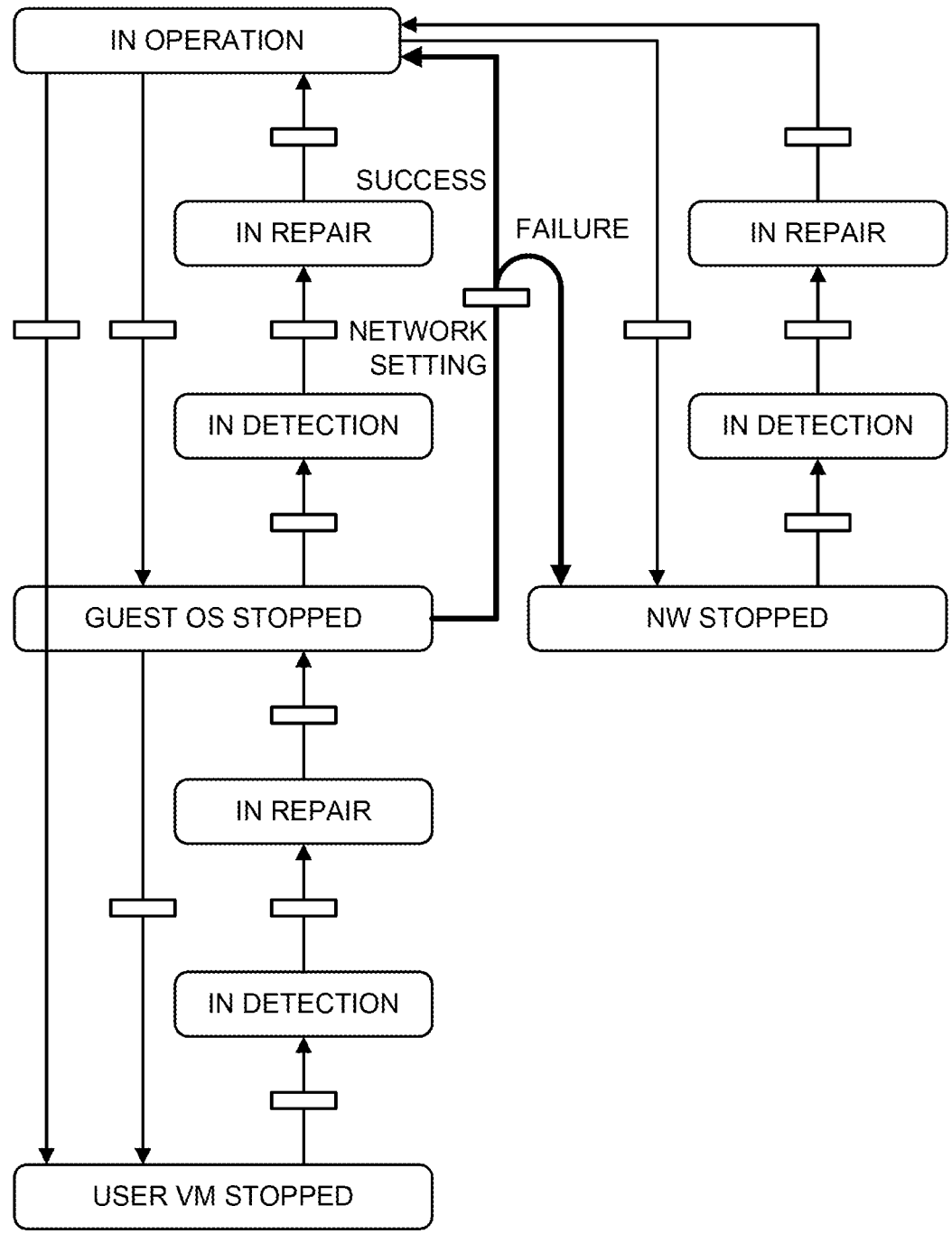
FIG. 11 is a view showing an example of an availability evaluation model in which cases where an operation procedure succeeds and fails are taken into consideration.
Figure 13:
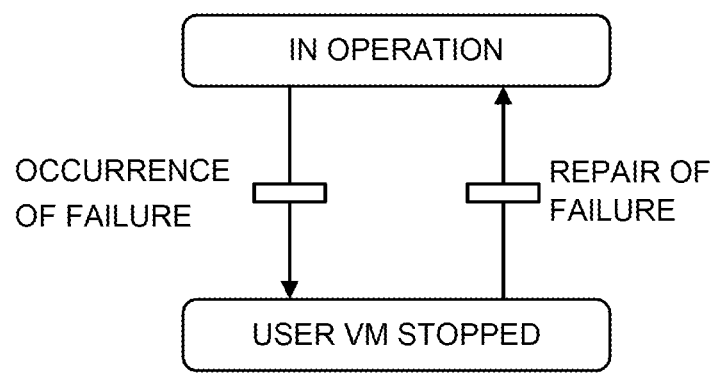
FIG. 13 is a view showing an example of a stochastic petri network that defines state transitions of a virtual machine.

For example, as shown in FIGS. 9 to 11, the present invention can also deal with a case of customizing an availability evaluation model by taking cases where an operation procedure succeeds and fails into consideration. For example, the example shown in FIG. 9 shows that it is likely that the "in operation" state transitions (does not change) to the "in operation" state if "restart of VM" succeeds, and that the "in operation" state transitions to the "user VM stopped" state if "restart of VM" fails. Moreover, FIG. 10 shows a customized availability evaluation model in which state transitions resulting from the cases where the datacenter operation procedure for "start of guest OS" succeeds and fails are added. Further, FIG. 11 shows a customized availability evaluation model in which state transitions resulting from the cases where the datacenter operation procedure for "network setting" succeeds and fails are added.

In this case, the operation registration unit 34 receives event names of these stochastic petri network, transition source state names, transition destination state names for the success case, transition destination state names for the failure case, and success probabilities from the datacenter administrator and registers the same in the additional state transition registration table 38. FIG. 12 shows an example of the additional state transition registration table 38 for that case. The additional state transition registration table 38 has such a format that the transition destination state name for the success case, the transition destination state name for the failure case, and the success probability are registered unlike the additional state transition registration table 38 shown in FIG. 7.

In the example of FIG. 12, the set of "in operation," "in operation," and "user VM stopped" states occurs once, and the set of "guest OS stopped," "in operation," and "network stopped" states occurs twice. The number of occurrences of the latter set is the larger among the two patterns. Thus, the operation analysis unit 44 can select the set of "guest OS stopped," "in operation," and "network stopped" states as a most frequent customization pattern.

This application claims the benefit of priority based on Japanese Patent Application No. 2010-263498, filed Nov. 26, 2010, the entire contents of which are incorporated herein by reference.

Although the present invention has been described with reference to the embodiment, the present invention is not limited to the above embodiment. Various modifications that can be conceived by those skilled in the art can be made to the configuration and details of the present invention within the scope of the present invention.

Part or all of the embodiments are described in the following additional notes but are not limited thereto.

(Additional Note 1)

An availability evaluation device comprising: a state transition storage unit that stores definitions of a plurality of state transitions corresponding to configurations of a system; an additional state transition storage unit that stores definitions of state transitions that are used when operating the system, and that are different from the plurality of state transitions; an operation registration unit that receives the definitions of the state transitions used when operating the system and registers the definitions in the additional state transition storage unit; an availability analyzing unit that analyzes the availability of the system based on the definitions of the state transitions stored in the state transition storage unit and the definitions of the state transitions stored in the additional state transition storage unit; an operation analysis unit that analyzes common state transition patterns in at least part of the definitions of the plurality of state transitions used when operating the system, and stored in the additional state transition storage unit; and an operation analysis result output unit that outputs analysis results obtained by the operation analysis unit.

(Additional Note 2)

The availability evaluation device according to Additional Note 1, wherein the operation analysis unit analyzes the common state transition patterns every time a predetermined number of definitions of the state transitions used when operating the system are registered in the additional state transition storage unit.

(Additional Note 3)

The availability evaluation device according to Additional Note 1, wherein the operation analysis unit analyzes the common state transition patterns every predetermined period.

(Additional Note 4)

The availability evaluation device according to any one of Additional Notes 1 to 3, wherein the operation analysis unit extracts a most frequent state transition pattern among the common state transition patterns, and the operation analysis result output unit outputs information indicating the most frequent state transition pattern.

(Additional Note 5)

The availability evaluation device according to Additional Note 4, wherein the operation analysis unit extracts a most frequent state transition pattern for a predetermined transition source state among the common state transition patterns.

(Additional Note 6)

The availability evaluation device according to Additional Note 4, wherein the definition of the state transition used when operating the system includes information that indicates a transition probability of each state transition, and the operation analysis unit extracts a state transition pattern having the transition probability of a predetermined value or more, among the common state transition patterns.

(Additional Note 7)

An availability evaluation method comprising: storing in a state transition storage unit definitions of a plurality of state transitions corresponding to configurations of a system; storing in an additional state transition storage unit definitions of state transitions used when operating the system, which are different from the plurality of state transitions; receiving the definition of the state transitions used when operating the system and registering the definitions in the additional state transition storage unit; analyzing the availability of the system based on the definitions of the state transitions stored in the state transition storage unit and the definitions of the state transitions stored in the additional state transition storage unit; analyzing common state transition patterns in at least part of definitions of the plurality of state transitions used when operating the system, and stored in the additional state transition storage unit; and outputting analysis results on common state transition patterns.

(Additional Note 8)

A program for causing a computer including a state transition storage unit that stores definitions of a plurality of state transitions corresponding to configurations of a system, and an additional state transition storage unit that stores definitions of state transitions that are used when operating the system, and that are different from the plurality of state transitions, to implement: a function of receiving the definitions of the state transitions used when operating the system and registering the definitions in the additional state transition storage unit; a function of analyzing the availability of the system based on the definitions of the state transitions stored in the state transition storage unit and the definitions of the state transitions stored in the additional state transition storage unit; a function of analyzing common state transition patterns in at least part of the definitions of the plurality of state transitions used when operating the system, and stored in the additional state transition storage unit; and a function of outputting analysis results on the common state transition patterns.

10: AVAILABILITY EVALUATION DEVICE
20: VIRTUAL MACHINE SERVER
30: LIBRARY MANAGEMENT UNIT
32: STATE TRANSITION MANAGEMENT TABLE
34: OPERATION REGISTRATION UNIT
36: OPERATION REGISTRATION TABLE
38: ADDITIONAL STATE TRANSITION REGISTRATION TABLE
40: AVAILABILITY ANALYZING UNIT
42: AVAILABILITY ANALYSIS RESULT PRESENTATION UNIT
44: OPERATION ANALYSIS UNIT
46: OPERATION ANALYSIS RESULT PRESENTATION UNIT

I Claim:

1. An availability analysis device having a processor and memory, comprising:
 a state transition storage unit realized by the memory and configured to store definitions of a plurality of state transitions corresponding to configurations of a system, each of the definitions of the plurality of state transitions including a transition source state, a transition destination state and a transition probability;
 an additional state transition storage unit realized by the memory and configured to store definitions of a plurality of additional state transitions that are used when operating the system and that are different from the plurality of state transitions, each of the definitions of the plurality of additional state transitions including a transition source state, a transition destination state and a transition probability;
 an operation registration unit realized by the processor executing a program stored in the memory and configured to receive the definitions of the additional state transitions and register the definitions in the additional state transition storage unit;
 an availability analyzing unit realized by the processor executing the program stored in the memory and configured to analyze an availability indicating a ratio of time where the system is in operation, based on the definitions of the state transitions stored in the state transition storage unit and the definitions of the additional state transitions stored in the additional state transition storage unit;
 an operation analysis unit realized by the processor executing the program stored in the memory and configured to analyze a number of occurrences of each pair of the transition source state and the transition destination state in the definitions of the plurality of additional state transitions stored in the additional state transition storage unit; and
 an operation analysis result output unit realized by the processor executing the program stored in the memory and configured to output analysis results obtained by the operation analysis unit.

2. The availability analysis device according to claim 1, wherein the operation analysis unit is configured to analyze the number of occurrences every time a predetermined number of definitions of the additional state transitions are registered in the additional state transition storage unit.

3. The availability analysis device according to claim 2, wherein
- the operation analysis unit is configured to extract the pair having the largest number of occurrences, and
- the operation analysis result output unit is configured to output information indicating the pair having the largest number of occurrences.

4. The availability analysis device according to claim 1, wherein the operation analysis unit is configured to analyze the number of occurrences every predetermined time period.

5. The availability analysis device according to claim 4, wherein
- the operation analysis unit is configured to extract the pair having the largest number of occurrences, and
- the operation analysis result output unit is configured to output information indicating the pair having the largest number of occurrences.

6. The availability analysis device according to claim 1, wherein
- the operation analysis unit is configured to extract the pair having the largest number of occurrences, and
- the operation analysis result output unit is configured to output information indicating the pair having the largest number of occurrences.

7. The availability analysis device according to claim 6, wherein the operation analysis unit is configured to extract the pair having the largest number of occurrences for a predetermined transition source state.

8. The availability analysis device according to claim 6, wherein
- the operation analysis unit is configured to extract the pair having the largest number of occurrences in the additional state transitions each having the transition probability of a predetermined value among the plurality of additional state transitions.

9. An availability analysis method comprising:
- storing in a state transition storage unit definitions of a plurality of state transitions corresponding to configurations of a system, each of the definitions of the plurality of state transitions including a transition source state, a transition destination state and a transition probability;
- storing in an additional state transition storage unit definitions of a plurality of additional state transitions used when operating the system, which are different from the plurality of state transitions, each of the definitions of the plurality of additional state transitions including a transition source state, a transition destination state and a transition probability;
- receiving the definition of the additional state transitions and registering the definitions in the additional state transition storage unit;
- analyzing an availability indicating a ratio of time where the system is in operation, based on the definitions of the state transitions stored in the state transition storage unit and the definitions of the additional state transitions stored in the additional state transition storage unit;
- analyzing a number of occurrences of each pair of the transition source state and the transition destination state in the definitions of the plurality of additional state transitions stored in the additional state transition storage unit; and
- outputting analysis results on the common state transition patterns.

10. A non-transitory computer readable medium storing a program for causing a computer including a state transition storage unit configured to store definitions of a plurality of state transitions corresponding to configurations of a system, each of the definitions of the plurality of state transitions including a transition source state, a transition destination state and a transition probability, and an additional state transition storage unit configured to store definitions of a plurality of additional state transitions that are used when operating the system and that are different from the plurality of state transitions, each of the definitions of the plurality of additional state transitions including a transition source state, a transition destination state and a transition probability, to implement:
- a function of receiving the additional definitions of the state transitions and registering the definitions in the additional state transition storage unit;
- a function of analyzing an availability indicating a ratio of time where the system is in operation, based on the definitions of the state transitions stored in the state transition storage unit and the definitions of the additional state transitions stored in the additional state transition storage unit;
- a function of analyzing a number of occurrences of each pair of the transition source state and the transition destination state in the definitions of the plurality of additional state transitions stored in the additional state transition storage unit; and
- a function of outputting analysis results on the common state transition patterns.

* * * * *